US008359360B2

(12) United States Patent
Logue et al.

(10) Patent No.: US 8,359,360 B2
(45) Date of Patent: Jan. 22, 2013

(54) ELECTRONIC MESSAGE SYSTEM WITH FEDERATION OF TRUSTED SENDERS

(75) Inventors: Jay D. Logue, San Jose, CA (US); Timothy T. Sullivan, Portola Valley, CA (US); Richard Landsman, Scotts Valley, CA (US); Phillip Y. Goldman, Los Altos, CA (US); Susan Rayl Goldman, legal representative, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 211 days.

(21) Appl. No.: 12/633,290

(22) Filed: Dec. 8, 2009

(65) Prior Publication Data
US 2010/0138658 A1 Jun. 3, 2010

Related U.S. Application Data

(62) Division of application No. 11/080,240, filed on Mar. 15, 2005, now Pat. No. 7,650,383.

(51) Int. Cl.
*G06F 15/16* (2006.01)
(52) U.S. Cl. ........................................ 709/206
(58) Field of Classification Search ............... 709/206
See application file for complete search history.

(56) References Cited

U.S. PATENT DOCUMENTS

| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |

(Continued)

FOREIGN PATENT DOCUMENTS

| DE | 19708856 | 9/1998 |
| EP | 0463252 | 1/1992 |

(Continued)

OTHER PUBLICATIONS

U.S. Appl. No. 10/747,557, filed Dec. 29, 2003, Sullivan, et al.

(Continued)

*Primary Examiner* — Ario Etienne
*Assistant Examiner* — Hee Soo Kim
(74) *Attorney, Agent, or Firm* — Workman Nydegger (57) ABSTRACT

Systems and methods for allowing challenge messages to be sent directly to a recipient's inbox where normally the challenge message would be sent to a pending folder or deleted. Challenge messages sent between federated messaging services contain a federated token which can be identified, authenticated and validated to determine whether the challenge message should be sent to a recipient's inbox. The federated token can include an authentication portion and a validation portion. Authentication methods for the authentication portion can include, for example, checksums, salts, hashes and digital signatures. Once a federated token is authenticated by decrypting the authentication portion according to one or more of these authentication methods, the federated token is validated by determining the defined use-base and determining whether the receipt of the federated token satisfies the defined use.

20 Claims, 5 Drawing Sheets

U.S. PATENT DOCUMENTS

| | | |
|---|---|---|
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A | 7/1999 | Hall |
| 5,937,162 A | 8/1999 | Funk et al. |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,052,709 A | 4/2000 | Paul |
| 6,055,510 A | 4/2000 | Henrick et al. |
| 6,057,841 A | 5/2000 | Thurlow et al. |
| 6,073,142 A | 6/2000 | Geiger et al. |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 | 3/2001 | Cobb |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 | 5/2001 | Namekawa |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 | 7/2002 | McCormick et al. |
| 6,457,044 B1 | 9/2002 | IwaZaki |
| 6,460,074 B1 | 10/2002 | Fishkin |
| 6,484,197 B1 * | 11/2002 | Donohue ..................... 709/206 |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge, Jr. et al. |
| 6,691,156 B1 | 2/2004 | Drummond et al. |
| 6,708,205 B2 | 3/2004 | Sheldon et al. |
| 6,748,422 B2 | 6/2004 | Morin et al. |
| 6,856,963 B1 | 2/2005 | Hurwitz |
| 6,868,498 B1 | 3/2005 | Katsikas |
| 6,880,088 B1 | 4/2005 | Gazier et al. |
| 6,883,095 B2 | 4/2005 | Sandhu et al. |
| 7,043,753 B2 | 5/2006 | Roddy et al. |
| 7,065,341 B2 | 6/2006 | Kamiyama et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,185,359 B2 | 2/2007 | Schmidt et al. |
| 7,188,358 B1 | 3/2007 | Hisada et al. |
| 7,263,545 B2 | 8/2007 | Digate |
| 7,346,696 B2 | 3/2008 | Malik |
| 7,383,433 B2 | 6/2008 | Yeager et al. |
| 7,512,788 B2 | 3/2009 | Choi et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 | 7/2002 | Scheussler et al. |
| 2002/0107856 A1 | 8/2002 | Scheussler et al. |
| 2002/0116641 A1 | 8/2002 | Mastrianni |
| 2002/0147726 A1 | 10/2002 | Yehia et al. |
| 2002/0194308 A1 | 12/2002 | Hall |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0030680 A1 | 2/2003 | Cofta et al. |
| 2003/0037103 A1 | 2/2003 | Salmi et al. |
| 2003/0037250 A1 | 2/2003 | Walker et al. |
| 2003/0065926 A1 | 4/2003 | Schultz et al. |
| 2003/0081621 A1 | 5/2003 | Godfrey et al. |
| 2003/0086543 A1 | 5/2003 | Raymond |
| 2003/0097597 A1 | 5/2003 | Lewis |
| 2003/0110400 A1 | 6/2003 | Cartmell et al. |
| 2003/0163691 A1 | 8/2003 | Johnson |
| 2003/0167311 A1 | 9/2003 | Kirsch |
| 2003/0167402 A1 | 9/2003 | Stolfo et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz et al. |
| 2004/0003283 A1 | 1/2004 | Goodman et al. |
| 2004/0015554 A1 | 1/2004 | Wilson |
| 2004/0054887 A1 | 3/2004 | Paulsen, Jr. et al. |
| 2004/0087300 A1 | 5/2004 | Lewis |
| 2004/0111480 A1 | 6/2004 | Yue |
| 2004/0143633 A1 | 7/2004 | McCarty |
| 2004/0148358 A1 | 7/2004 | Singh et al. |
| 2004/0167941 A1 | 8/2004 | Prahlad et al. |
| 2004/0181581 A1 | 9/2004 | Kosco |
| 2004/0199595 A1 | 10/2004 | Banister et al. |
| 2004/0236835 A1 | 11/2004 | Blankenship |
| 2004/0236838 A1 | 11/2004 | Tout |
| 2004/0243676 A1 | 12/2004 | Blankenship |
| 2004/0243698 A1 | 12/2004 | Blankenship |
| 2005/0015481 A1 | 1/2005 | Blankenship |
| 2005/0015482 A1 | 1/2005 | Blankenship |
| 2005/0044155 A1 * | 2/2005 | Kaminski et al. ............. 709/206 |
| 2005/0055410 A1 * | 3/2005 | Landsman et al. ............ 709/206 |
| 2005/0076220 A1 | 4/2005 | Zhang et al. |
| 2005/0076221 A1 | 4/2005 | Olkin et al. |
| 2005/0076222 A1 | 4/2005 | Olkin et al. |
| 2005/0081059 A1 | 4/2005 | Bandini et al. |
| 2005/0188045 A1 | 8/2005 | Katsikas |
| 2005/0250473 A1 * | 11/2005 | Brown et al. .................. 455/411 |
| 2006/0021017 A1 * | 1/2006 | Hinton et al. .................... 726/10 |
| 2006/0059238 A1 | 3/2006 | Slater et al. |
| 2006/0101021 A1 | 5/2006 | Davis et al. |
| 2006/0112165 A9 | 5/2006 | Tomkow et al. |
| 2006/0168048 A1 | 7/2006 | Lyle et al. |
| 2007/0016641 A1 | 1/2007 | Broomhall |
| 2008/0162926 A1 | 7/2008 | Xiong et al. |

FOREIGN PATENT DOCUMENTS

| | | |
|---|---|---|
| EP | 0651533 | 5/1995 |
| EP | 0686327 | 12/1995 |
| EP | 0721268 | 7/1996 |
| EP | 0725523 | 8/1996 |
| EP | 0760565 | 7/1998 |
| EP | 0883271 | 12/1998 |
| WO | 94/06236 | 3/1994 |
| WO | 96/09714 | 3/1996 |
| WO | 96/24213 | 8/1996 |
| WO | 97/14234 | 4/1997 |
| WO | 97/20423 | 6/1997 |

| | | |
|---|---|---|
| WO | 97/23082 | 6/1997 |
| WO | 97/24825 | 7/1997 |
| WO | 97/26709 | 7/1997 |
| WO | 98/37675 | 8/1998 |
| WO | 99/10817 | 3/1999 |
| WO | 01/16695 | 3/2001 |
| WO | 02/077768 | 10/2002 |
| WO | 09/044617 | 5/2003 |

OTHER PUBLICATIONS

U.S. Appl. No. 11/017,461, filed Dec. 20, 2004, Landsman.
U.S. Appl. No. 11/098,333, filed Apr. 4, 2005, Logue, et al.
Aguilar, Rose, AOL fights to ban junk, CNETNews.com, Sep. 6, 1996, 3 pages, http://www.news.com/News/Item/0.43106,00.html.
Andrew Leonard, SpamBomers, Sep. 1997, 7 pages, Salon Magazine + about 21st + newsletter.
Bob Tiptrie, A Way to Stop Spam Messages, online, retrieved Apr. 25, 2003, 4 pages, retrieved from the internet http://groups.google.com/groups.
Cementing Online Partnerships and Improving User Experience, RSA Security, retrived online May 17, 2006, 7 pages, www.rsasecurity.com.
Chinese Abstract for CN 1117680, published Feb. 28, 1996.
CNET News.com staff, ISP: Internet Spam Provider, Feb. 18, 1997, 2 pages, CNET News.com.
Cole-Gomolski, Barb, Adoption of S/MIME still lagging, May 11, 1998, 4 pages, http://www.computerworld.com/home/features.nsf/ . . . .
Controlling E-Mail Spam, online, retrieved on Mar. 28, 2003, 5 pages, retrieved from the Internet http://spam.abuse.net/adminhelp/mail.shtml.
Cynthia Dwork et al., Pricing via Processing or Combatting Junk Mail, Jul. 2002, 12 pages, Technical Report CS95-20, Matematics & Computer Science, Weizmann Institute of Science.
Cynthia Dwork, Fighting Spam May be Easier Than You Think, 1992, 30 pages, presentation given in Crypto.
Cynthia Dwork, Fighting Spam: The Science, 2004, pp. 3-4, M. Farach-Colton (Ed.): Latin 2004, LNCS 2976, Springer-Verlag Berlin.
David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.
David F. Skoll, How to make SURE a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d . . . .
Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.
Douglas G. Henke, All Hail Emperor Lewis?, online, Feb. 20, 1997, 2 pages, retrived Apr. 25, 2003, retrived from the internet http://groups.google.com/groups.
Ed Foster, The Gripe Line Threatening legal action may be the quickeest way off a junk e-mailer's list, Info World Info Quote, Sep. 9, 1996, 2 pages, vol. 18, Issue 37, http://www.infoworld.com/egi-bin/siplayArchives.pl? . . . .
Foiling Spam with an Email Password System, online,retrieved on Jun. 28, 2004, 10 pages, retrieved from the Internet, http://www.uwasa.fi/~ts/info/spamfoil.html.

J. Klensin et al., IMAP/POP Authorize Extension for Simple Challenge/Response, Sep. 1997, 5 pages.
Jameson, Bob, Filter for mail not addressed to you, Jesse Berst's Anchor Desk, Sep. 6, 1996, 3 pages, http://www.news.com/News/Item/0.43106,00.html.
Janet Kornblum, Programmer Writes Spam Bomb, Aug. 6, 1997, 2 pages, CNET News.com.
Julian Byrne, My Spamblock; Was: Thwarting UCE Address Culling Programs, online, Jan. 19, 1997, 2 pages, retrieved Apr. 28, 2003, retrieved from the internet http://google.com/groups.
Julian Byrne, New Improved EZSPAM! Was: My Spamblock . . . , online, Jan. 28, 1997, 4 pages, retrieved Apr. 25, 2003, retrived from the internet, http://groups.google.com/groups.
Lorrie Faith Crano et al, Spam!, Aug. 1998, pp. 74-83, Communications of the ACM, vol. 41, No. 8.
MailCircuit's Email HandShake Verification and Spam Filter Process, online, copyright 1996-2003, 2 pages, MailCircuit.com, retrieved from the Internet http://www.mailcircuit.com/filter.htm.
Michael's Stop Junk E-Mail, Stop Junk E-mail, Nov. 17, 1996, 2 pages, http:/www.crl.com/-michaelp/stopjunkmail.html.
Mihir Bellare et al., Does Paralllel Repition Lower the Error in Computationally Sound Protocols?, 1997, 24 pages, Proceedings of the 38th Symposium on Foundations of Computer Science, IEEE.
MIT LCS, Applied Security Reading Group, by Email Sit and Kevin Fu, 2 pages, updated May 5, 2003 on the Internet http://www.pdocs.lcs.mit.edu/asrg/.
Noni Naor, Verification of a Human in the Loop or Identification via the Turing Test, Sep. 1996, Cited in All On-Line Papers.
Paul Hoffman et al., Unsolicited Bulk Email: Mechanisms for Control, Internet Mail Consortium Report UBE-SOL, IMCR-2008, revised May 4, 1998, 16 pages.
Paul Hoffman et al., Unsolicited Bulk Email: Mechanisms for Control, Internet Mail Consortium Report UBE-SOL, IMCR-005, Oct. 13, 1997, 31 pages.
Public Access Networks Corporation, Responding to Unsolicited Commercial Email (UCE, "email spam"), Feb. 25, 1997, 5 pages, http:www.panix.com/uce.html.
Ronald F. Guilmette, To Mung or Not to Mung, online, Jul. 24, 1997, 2 pages, retrieved Apr. 25, 2003, retrieved from the internet http://groups.google.com/groups.
Showing Full Headers of a Message, Nov. 6, 1998, 3 pages, http:/www.panix.com/headers.html.
The Penny Black Project, online, retrieved on May 8, 2006, 2 pages, retrieved from the Internet http://research.microsoft.com/research/sv/PennyBlack/.
Tim Richardson, Simple Notes on Internet Security and Email, Jun. 28, 1999, 2 pages, http:/www.timrichardson.net/security.html.
"Variable Envelope Return Paths." D.J. Berstein. Feb. 1, 1997. <http://cr.yp.to/proto/verp.txt>. 2 pages.
"RFC28822." P. Resnick. Qualcom Incorporated. Apr. 2001. <http:rfc.net/rfc2822.html>. 51 pages.
Qualcomm Inc. "Eudora MailPro Version 3.0 for Windows User Manual", Jun. 1997, 198 pages.
Simpson, W. "Request for Comments (RFC) 1994: PPP Challenge Handshake Authentication Protocol (CHAP)", published by Network Working Group, Aug. 1996, 14 pages.

* cited by examiner

ELECTRONIC MESSAGE SYSTEM WITH FEDERATION OF TRUSTED SENDERS

FEDERATION OF TRUSTED SENDERS

This application is a divisional of U.S. application Ser. No. 11/080,240, filed Mar. 15, 2005 now U.S. Pat. No. 7,650,383 and entitled "Electronic Message System with Federation of Trusted Senders," which application is hereby incorporated by reference in its entirety for all purposes.

BACKGROUND OF THE INVENTION

1. The Field of the Invention

The present invention relates generally to systems and methods for delivering electronic messages. More particularly, embodiments of the invention relate to allowing challenge messages from federated messaging services to be delivered directly to a recipient's inbox if the challenge message is authenticated and validated.

2. Relevant Technology

Electronic messaging or e-mail has become, for many people, a primary means of communication. The ease by which a person is able to send and receive an electronic message makes this form of communication extremely attractive. Unfortunately, others utilize electronic messaging to send unsolicited bulk electronic messages, better known as "spam." Unsolicited electronic messages may include commercial advertisements, political messaging, as well as pornographic solicitations. Due to the influx of unsolicited electronic messages, people have become wary of giving out their electronic addresses for fear that their address will be sold to would-be solicitors. Further, those who receive spam are often not able to successfully request removal from mass e-mailing lists. Moreover, it is difficult to ascertain who has sent unsolicited electronic messages, since solicitors often use fabricated addresses or refrain from including one altogether.

Challenge and response mechanisms have been developed as a way to filter out unwanted electronic messages. When an electronic message is directed to a recipient, the message is delivered to the recipient only if the sender is identified as being authorized to send electronic messages to the recipient. Usually, the recipient has a list of approved senders, allowing the electronic message from the approved senders to be sent to the recipient's inbox without a challenge.

However, when the sender is unknown, a challenge message is sent to the sender to verify that the sender's address is valid and that the sender is a person as opposed to a machine before delivering the senders email to the recipient's inbox. The sender is confirmed by asking the sender to respond to the challenge message in a way that affirmatively verifies that the sender is a person as opposed to a machine. This challenge/response method is quite successful in eliminating unsolicited electronic messages that are sent by mass-mailers.

Figure 1A:
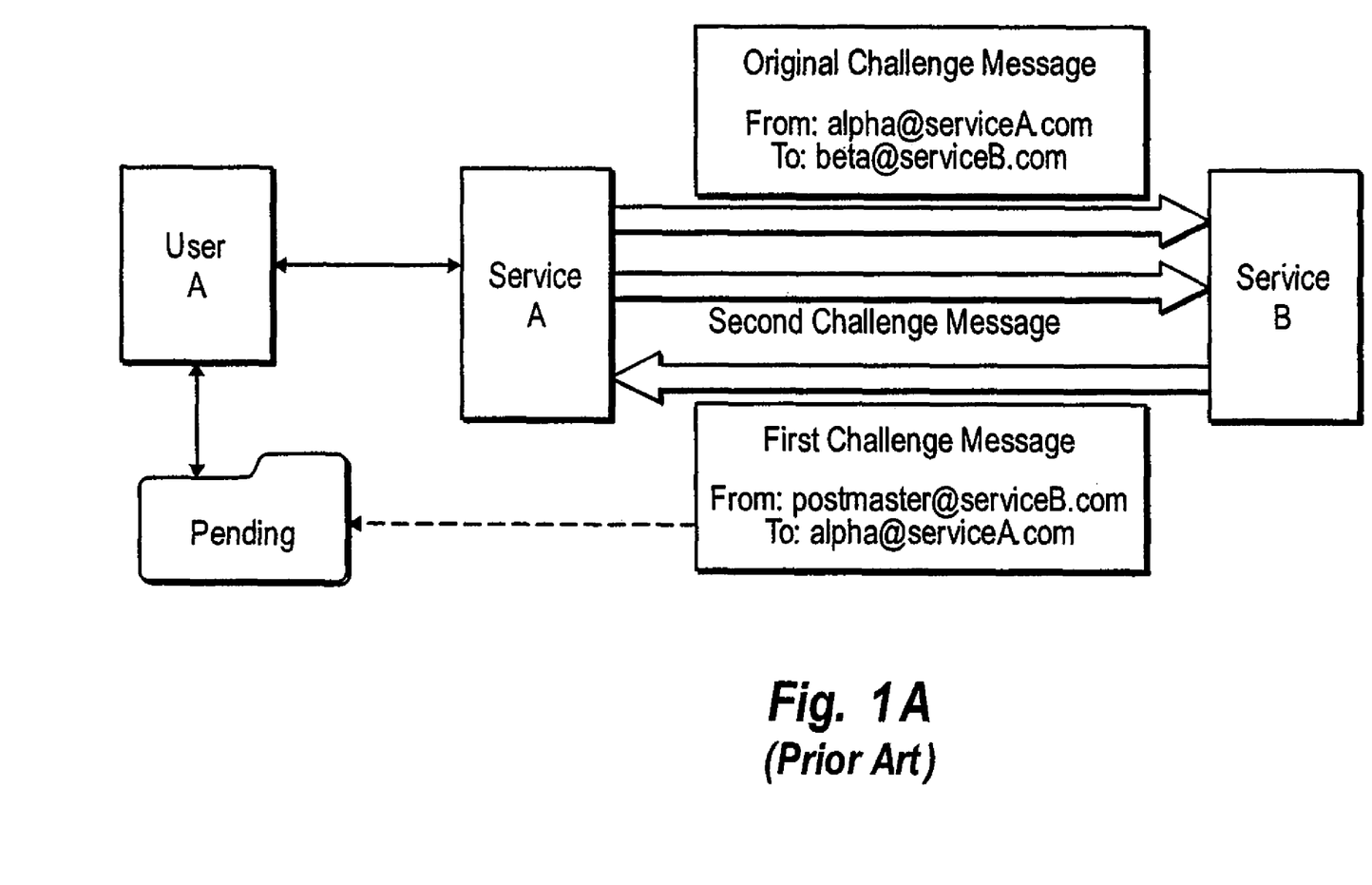
FIG. 1A illustrates diagrammatically a first prior art scenario where multiple challenges are generated.
Figure 1B:
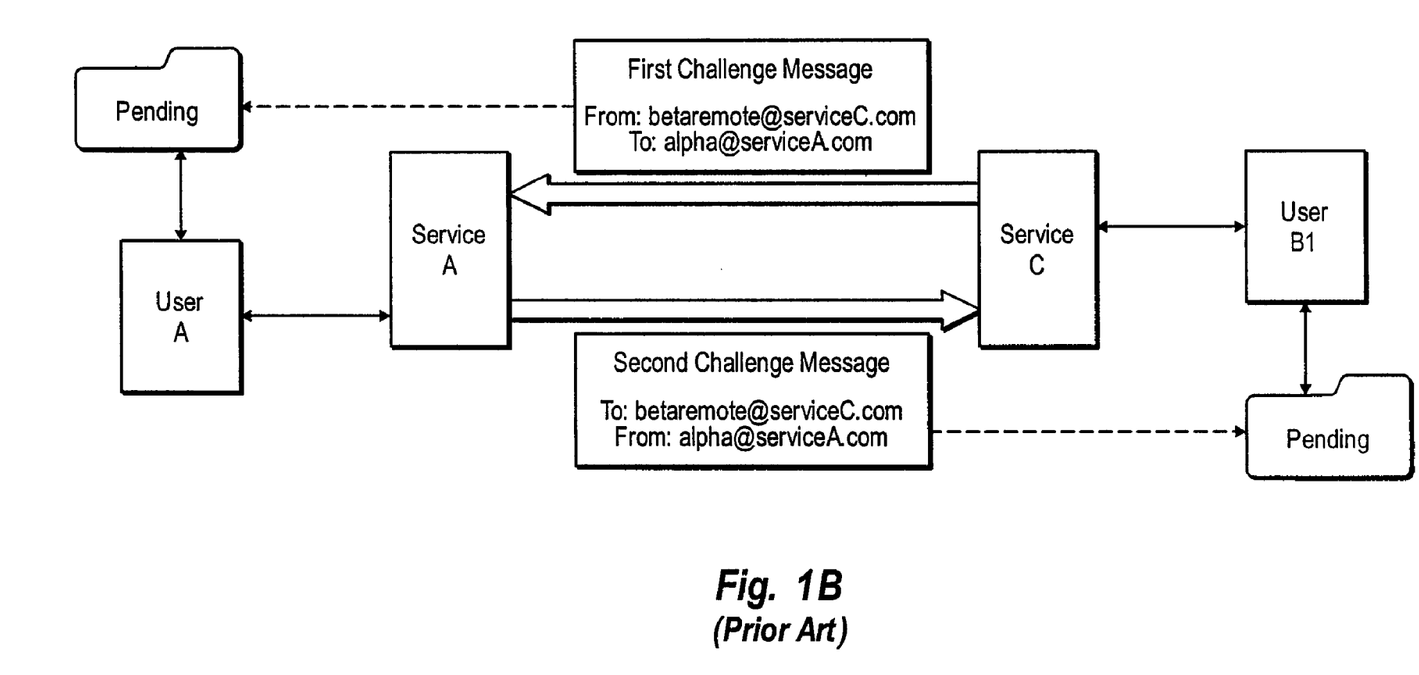
FIG. 1B illustrates diagrammatically a second prior art scenario where multiple challenge messages are generated.

However, challenge/response systems are based on a set of rules that do not take into consideration certain scenarios in which a recipient would actually like to receive an incoming message. In these situations, the challenge/response system is overinclusive, meaning that the spam protection actually prevents wanted messages from being sent directly to the recipient. FIGS. 1A and 1B illustrate two such scenarios.

In one example, shown in FIG. 1A, user A sends an original message from service A to user B associated with service B, the original messaging being addressed TO beta@serviceB.com and FROM alpha@serviceA.com. Assuming this is the first time that user B has received an electronic message from user A, service B will generate a challenge message. The server generating the challenge message, in some cases, will place in the FROM field the identity of the server, resulting in a challenge message being addressed TO alpha@serviceA.com and FROM postmaster@serviceB.com. Because service A will likely not recognize the address in the FROM field of the challenge message, service A will send the incoming challenge message to user A's pending folder and user A will not have the opportunity to reply.

Furthermore, if service A utilizes a challenge/response mechanism, service A will issue a second challenge in response to the incoming first challenge message containing the unknown address (i.e., postmaster@serviceB.com). The second challenge sent to service B may result in yet another challenge being sent to service A. Meanwhile, the original message from user A remains undelivered to user B at user B's server. Appreciably, a "challenge war" has been created in which multiple challenges are sent to both parties, and neither party is aware of the existence of an original message and/or challenge message.

In another example, shown in FIG. 1B, user A associated with messaging service A sends an original message to user B associated with messaging service B, the original message being addressed TO beta@serviceB.com and FROM alpha@serviceA.com. Suppose user B's service B then forwards the message to user B's remote account user B1 associated with service C. With some forwarding mechanisms, the forwarding protocol creates an electronic message in which the FROM field uses the address of the original sender. Thus, a forwarded message may be addressed TO beta1remote@serviceC.com and FROM alpha@serviceA.com. Assuming this is the first time service C has received a message from user A, service C will send a challenge message to user A. Thus, a challenge message from service C will be addressed TO alpha@serviceA.com from beta1remote@serviceC.com or postmaster@serviceC.com. The challenge message will be sent to A's pending folder since the FROM address is unknown and the original message left undelivered to user B1.

Further, service A could send a subsequent challenge message to service C if it does not recognize the FROM address. However, because service C is unfamiliar with user A's address, the challenge message is sent to user B1's pending folder. Thus, both user A and user B1 will have challenge messages in their pending folders, but will not be aware of them or may become aware of them after the time for responding to the challenge message has expired. Furthermore, repeated attempts by user A to send messages to user B will continue to result in additional challenges by both services A and C, which creates a "challenge war" situation in which both parties are sending challenges and yet neither party is aware of the incoming challenges, while, in reality, it is likely that user A and user B1 would not consider messages from each other as spam.

Thus, conventional challenge and response filtering systems are over inclusive and prevent users from receiving desired challenge messages in situations where the user would actually like to receive the message. It would be advantageous to provide message filtering systems that are capable of delivering such electronic messages without issuing a challenge message or otherwise failing to deliver the messages.

BRIEF SUMMARY OF THE INVENTION

The present invention relates to systems and methods for delivering electronic messages including challenge messages while preventing challenge wars. Challenge wars can occur when a user sends a challenge message to a recipient, but the challenge message is sent to a pending folder or deleted because it is viewed by the recipient's filtering mechanism as spam. The recipient may then send a responding challenge to the user, whose filtering mechanism might also view the return challenge message as spam. Thus, both parties send messages to each other that they would like to receive, yet neither one receives the message. The present invention provides that a federated token can be used to identify challenge messages and, if the federated token is properly authorized, allows the challenge message to be sent directly to a recipient's inbox. This provides the recipient with the opportunity to respond to the challenge and also prevents further challenges from ensuing on either end.

In one embodiment, a computer networked system is provided in which a first federated messaging service communicates with a second federated messaging service via, e.g., the Internet. Both federated messaging services may have one or more user computers and one or more servers. The server contains a processor that includes a messaging program, a tokenization module and an authorization module. The server may also have access to one or more databases and a user computer's inbox and pending folder.

When a server generates a challenge message, the server inserts a federated token into the challenge message. The federated token may be inserted into any suitable portion of the challenge message. The challenge message is then delivered to a recipient server. The federated token is a unique string which acts as a marker on challenge messages. In one embodiment, the federated token includes one or more of a server identifier, a version indicator, a time stamp, a uniquifier, a usage code, an authentication code, and the domain identifier. The time stamp, uniquifier and usage code constitute a validation portion while the authentication code constitutes an authentication portion. In other embodiments, the same code can serve for both authentication purposes and validation purposes. The usage code can be an encrypted code which notifies the receiving server of the defined use-base for the federated token. The use basis can be, for example, single-use, multiple-use, or time-based usage. The authentication code can be an encrypted value which enables servers to verify the identity of the transmitting server and to verify the integrity of the message. Authentication methods for forming the authentication code include, but are not limited to, checksums, salts, hashes, and digital signatures.

When a challenge message is received with what appears to be a federated token, the receiving server authenticates and validates the federated token. Authentication can include decrypting the authentication code. For example, the receiving server can recalculate a checksum to verify that the recalculated checksum is the same as the original checksum in the challenge message. Validation includes identifying the use-basis for the federated token and then determining whether the receipt of the federated token satisfied the use-basis criteria.

Tables can be stored in transmitting and receiving servers to maintain information necessary to generate, authenticate and/or validate a federated token. This information can include private and partner keys for those encryption methods that require same. Keys can be exchanged between servers at the same time as issuing a challenge message or in a subsequent secure message using any of the cryptographic techniques or those known in the art, including the use of digital certificates.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The present invention relates to challenge/response electronic messaging systems and methods for delivering challenge messages to a recipient's inbox in situations where it is likely that the recipient would desire to receive the challenge message. Advantageously, the present invention is useful in avoiding "challenge wars" which can occur when two messaging services send crossing challenge messages and where the crossing challenge messages are delivered to pending folders or deleted on each messaging service so that both parties are unaware of the challenge event. In certain situations, both parties would actually like to be provided the opportunity to respond to the challenge message in order to establish authorized communication with each other. Thus, the present invention is directed to systems and methods for identifying challenge messages and allowing them to be sent directly to a recipient's inbox instead of being handled as spam.

The present invention provides that two or more messaging services can become "federated." As used herein, the term "federated messaging service" refers to a messaging service that has implemented systems and protocols which allows a federated messaging service to generate and/or authorize challenge messages. Challenge messages sent from one federated messaging service to another contain a "federated token." As used herein, the term "federated token" refers to a marker, indicator or tag that federated messaging services use to identify and authorize challenge messages. As used herein, the term "authorized challenge message" refers to a challenge message containing a federated token where the federated token has been identified, authenticated and validated in order to verify that the challenge message was sent from one of the federated messaging services and not by an unauthorized third party. Once a federated messaging service authorizes a challenge message, the authorized challenge message is delivered to the intended user's inbox.

Further, most filtering mechanisms do not parse an incoming message to identify the content in order to determine whether or not the message is a challenge message. Rather, the filtering mechanisms usually operate on a set of rules that identify known senders. Thus, in certain situations, it may not be obvious to messaging services that an incoming message is a challenge message to which the recipient would like to respond. Federated tokens identify the presence of a challenge message and enable challenge messages to be recognized even when the sender may be unknown.

Details of the network environment, data structure of the federated tokens, methods for authentication and validation, and examples illustrating the present invention are provided as follows.

1. COMPUTER ENVIRONMENT AND DATA STRUCTURE OF AUTHORIZED CHALLENGE MESSAGES

Figure 2:
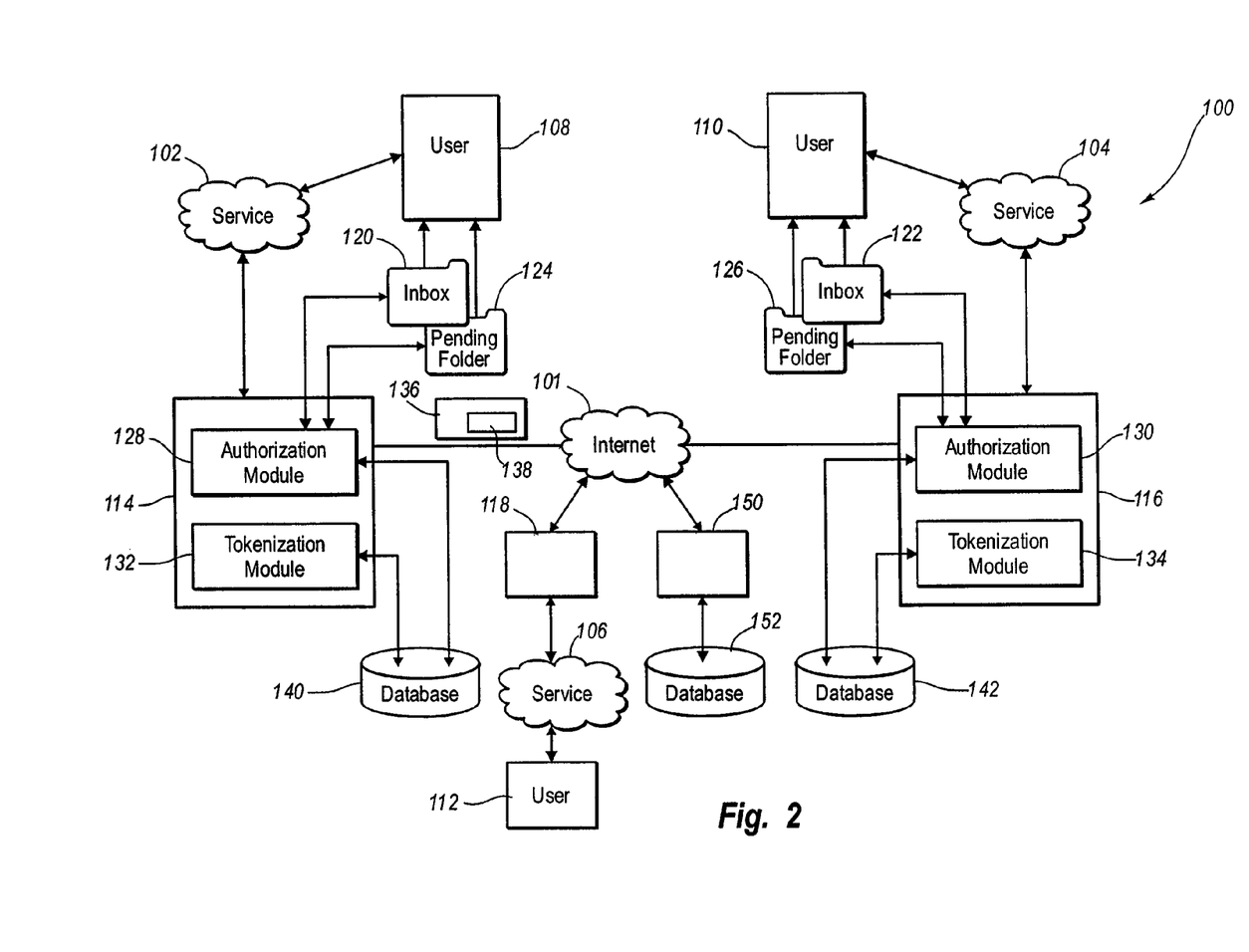
FIG. 2 illustrates an exemplary network environment and system for implementing features of the present invention.

Turning to FIG. 2, an exemplary network system 100 is illustrated in which one or more users are able to send electronic messages to each other via, e.g., the Internet 101. System 100 includes two or more messaging services 102, 104, 106, each including one or more client devices or user computers 108, 110, 112, respectively, each device representing a user. Each messaging service 102, 104, 106 includes one or more servers 114, 116, 118 which act as portals for outgoing and incoming challenge messages to and from one service to another. Each server 114, 116, 118 can be connected to each other via, for example, the Internet 101.

As used herein, the term "messaging service" refers to a system which provides electronic messaging capabilities to one or more users. Each messaging service 102, 104, 106 is generally identified by a different domain name. Each domain name is associated with one or more servers (each having an IP address). Thus, users associated with a particular messaging service will use a common domain name, but may send and receive electronic messages through multiple servers associated with the domain name. Each messaging service 102, 104, 106 thus can include one or more servers, with servers 114, 116, 118 being representative only of one of the servers associated with a domain name. Messaging services 102, 104, 106 can be an intranet, local area network (LAN), or wide area network (WAN) or any network of any size.

It will be appreciated that each server 114, 116, 118 can include the processors, databases, and memory required in order to fully implement a messaging system. This may include a filtering mechanism for identifying and filtering potential spam messages. Each user computer 108, 110, 112 may also include messaging programs which generate and otherwise handle electronic messages locally for each user. For example, each user computer 108, 110 can include an inbox 120, 122 and a pending folder 124, 126, respectively. Server 114, 116 can filter electronic messages and send them to the inbox or pending folder accordingly. As used herein, the term "electronic message" generally refers to an electronic message in any format such at, but not limited to, e-mail, voice mail, voice-over-IP, text messaging, instant messaging, and the like.

As defined above, federated messaging services include systems and protocols for generating, identifying and/or authorizing challenge messages. Thus, in one embodiment of FIG. 2, messaging services 102, 104 are "federated messaging services" since they contain an authorization module 128, 130 and a tokenization module 132, 134, respectively, that can be implemented in, for example, servers 114 and 116, respectively. In contrast, messaging service 106 is not a federated messaging service but is provided to illustrate that the present invention can be implemented between federated and non-federated messaging services.

In one embodiment, both servers 114, 116 provide electronic messaging services using a challenge/response filtering system. The challenge/response protocol can be any configuration known in the art. Generally, challenge/response protocols use challenge messages that require a human response to determine whether an unidentified sender is human as opposed to a machine by requiring the sending entity to perform a specified task that a machine is unlikely to be capable of performing. Examples of suitable challenge/response systems that can be adapted for use with the methods disclosed herein are described in U.S. patent application Ser. No. 10/174,561, filed Jun. 18, 2002 and U.S. Pat. No. 6,199,102, issued Mar. 6, 2001, both of which are incorporated herein by reference.

However, other embodiments are contemplated in which only one of servers 114, 116 implements a challenge/response filtering mechanism and the other server includes another spam filtering mechanism including, but not limited to, address or white lists, or other mechanisms which sends messages from unidentified senders to a pending folder. Thus, while the present invention is directed to avoiding bi-directional challenge wars in which both servers 114, 116 include a challenge/response system, the present invention may also be used to avoid the situation where the challenge is unidirectional. So, for example, server 114 of messaging service 102 can implement a challenge/response system and can include both an authorization module 128 and a tokenization module 132 that can generate and identify authorized challenge messages. Meanwhile, server 116 of messaging service 104 implements authorized address lists to filter unwanted mail and can include only an authorization module 130 that only identifies challenge messages, but does not generate them. Furthermore, depending on the desired configuration, messaging service 102 could include only a tokenization module 132 for generating authorized challenge messages, but not an authorization module 128 for identifying challenge messages, thus continuing to send challenge messages to the user's pending folder. Thus, it will be appreciated that various configurations for implementing the present invention may be possible.

Turning back to FIG. 2, when server 114 associated with federated messaging system 102 creates a challenge message 136 and initiates transmission thereof, the challenge message is processed by tokenization module 132. A federated token 138 is incorporated into the challenge message, which is then sent to, for example, server 116 associated with messaging system 104. The structure of federated tokens 138 and the manner in which they are incorporated into challenge messages 136 are described in more detail below. After the placement of federated token 138 into challenge message 136, the message is transmitted by, for example, the SMTP server system. Server 114 and/or recipient server 116 may be configured to operate as SMTP servers. At this point, a copy of the federated token 138 is not stored on the server 114. However, keys used to generate the federated token 138 may be stored at server 114, as will be described in further detail below.

When server 116 receives the challenge message 136 containing the federated token 138, authorization module 130 of server 116 evaluates challenge message 136 to determine (1) the existence of a federated token 138, (2) whether the federated token 138 is authentic; and (3) whether the federated token 138 is valid. Identification of a federated token 138 is indicative that a challenge message is from a federated messaging service. However, third parties may be able to intercept or copy the federated token. Thus, additional measures are provided to ensure that the federated token 138 is authentic and valid to determine whether the challenge message 136 is an authorized challenge message coming from a federated messaging service. During the authorization phase, server 116 can reference a database 142. (Server 114 is associated also with a database 140). Further, the authentication and/or validation step may require communication between the two servers 114, 116 or other servers to exchange encryption keys. For example, a certificate authorizing server 150 communicating with a database 152 can be used for exchanging keys required to carry out secure transactions, as will be described in more detail below.

If the challenge message 136 is an authorized challenge message, the server 116 places the authorized challenge message in the user's inbox 122, in effect delivering the challenge message to the user device 110. If no federated token is included in the challenge message 136 or if the federated token is determined to be not authentic or invalid, the challenge message is either discarded or placed in pending folder 126. Depending on the nature of the filtering system existing in server 116, a challenge message may then be sent to the entity that purports to have sent the challenge message 136.

2. STRUCTURE OF FEDERATED TOKENS

Figure 3:
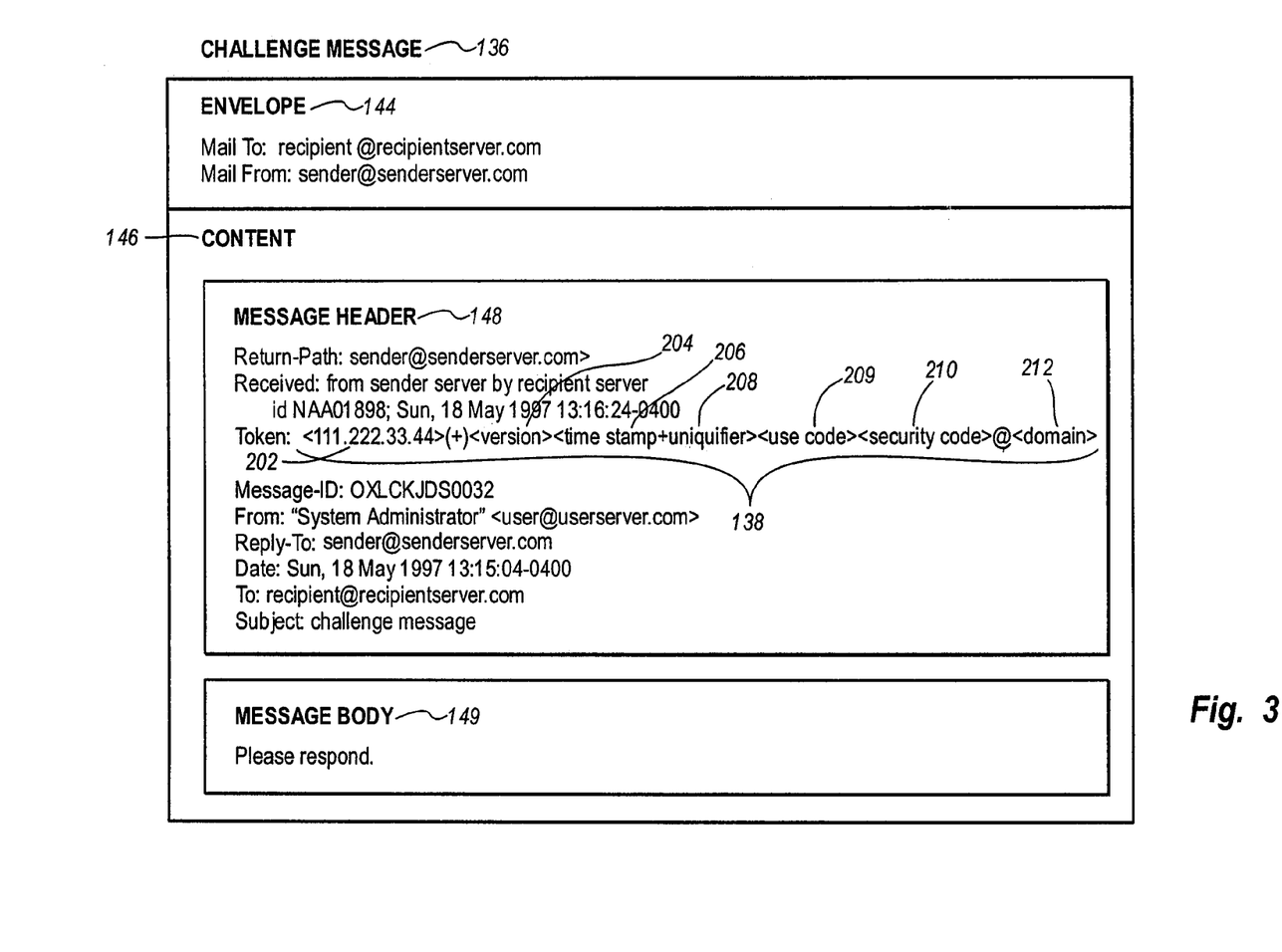
FIG. 3 illustrates one embodiment of the data structure of a challenge message.

With reference to FIG. 3, an exemplary data structure of a challenge message 136 is shown after it has been processed by a tokenization module 132, 134. Challenge message 136 includes envelope 144 and content 146. The content includes a header 148 and a body 149. The envelope 144 contains "envelope sender" and "envelope receiver" fields. The envelope 144 and content 146 are generated by the messaging program on, for example, the user computer 108 or server 114. Generally, the messaging program automatically creates the envelope using the information provided in the "To:" and "From:" header fields in header 148. In addition to the "To:" and "From:" fields, header 144 also contains other fields such as "Subject:", "Cc:", and "Date:". The message body 149 includes everything else in the content 146. Particularly in the case of challenge messages, the message body 149 will typically contain a message identifying the message as a challenge and requesting a response that is typically only performable by a human.

Generally, a federated token 138 can be embedded in any part of the challenge message 136. Exemplarily, in FIG. 3, the federated token 138 is shown as appended to or embedded in the content 146 of challenge message 136. The federated token 138 is generated by authorization module 128 of server 114. The federated token 138 is generally a unique string which acts as a marker, indicator or tag in the challenge messages 136 to identify that the challenge message was sent from a federated messaging service. The federated token 138 may have a variety of features in order to create a unique string. Generally, the data structure of the federated token 138 allows the federated token to be both authenticated and validated.

The following discussion relates to a specific example of a federated token 138 and the various fields that may be contained by the federated token. The following example represents only one way of implementing the federated tokens and any of a variety of other techniques can be used. In one embodiment, the federated token 138 is inserted in a field in message header 148 that specifically identifies the server from which the challenge message is sent.

The federated token 138 generally includes a server identifier portion, an authentication portion and a validation portion. It will be appreciated that the same alphanumeric code can be used for one or more purposes. In one embodiment, the federated token 138 includes a server identifier 202, a version indicator 204, a time stamp 206, a uniquifier 208, a use code 209, an authentication code 210, and the domain identifier 212. The server identifier 202 serves to identify the particular server from which the challenge message is sent. The server identifier 202 can be, e.g., the server IP address. The version 204 is typically a one character version indicator that indicates the version of the federated token. The time stamp 206 indicates the time that the federated token was generated and can be based on server's geographic location. The uniquifier 208 is typically an unsigned integer that is unique for each federated token generated on a particular server 114 in the same second. The use code 209 is an encrypted value which identifies the use basis of a particular federated token, as will be described in further detail below. The authentication code 210 is an encrypted value which verifies the source and/or integrity of the federated token, as will be described below. In this embodiment, the time stamp 206, uniquifier 208 and use code 209 are used for validation purposes while the authentication code 210 is used for authentication purposes. This example illustrates that authentication portions and validation portions are separate, while in other embodiments, they may be combined in a single portion of the federated token 138.

While the mere existence of a federated token in a challenge message does not ensure that the sender of a challenge message is associated with a federated messaging service, the federated token nonetheless can be used to confirm this fact by using one or both of the authentication and validation features. By authenticating and validating the federated token, the receiving messaging service can verify that the challenge message was sent from a federated messaging service. Features in the data structure of the federated token allow the federate token to be authenticated and validated as discussed above.

3. AUTHENTICATION METHODS

As used herein, "authentication" refers to any process used to establish that a challenge message was generated by a server associated with a federated messaging service. This can include protocols used to identify federated tokens and for establishing that the challenge message has maintained integrity during transmission. As used herein, the term "transmitting authorized server" will refer to a server associated with a federated messaging service that at least contains systems and protocols for generating federated tokens found in challenge messages. A "receiving authorized server" refers to a server associated with a federated messaging service that at least contains systems and protocols for authorizing federated tokens found in challenge messages. For purposes of this description, server 114 will be a transmitting authorized server and server 116 will be a receiving authorized server. It is not necessary that authorized challenge messages be sent only to transmitting authorized servers or receiving authorized servers. In some cases, a transmitting authorized server may include a federated token in every challenge message that is issued in case a receiving server is an authorized server.

As discussed above, the federated token includes one or more authentication codes 210. Each authentication code 210 preferably comprises at least one authentication technique, with the understanding that additional authentication techniques provide added levels of security. Authentication techniques may include, but are not limited to, encryption/decryption, checksums, hashes, digital signatures, and digital certificates. Many of the authentication techniques require knowledge of partner keys and private keys to encrypt or decrypt the authentication code in the federated token as well as for other uses that may be associated with handling a federated token. When the transmitting authorized server 114 generates the federated token, it uses one or more keys to perform the encryption. The receiving authorized server 116 then uses a key(s) to decrypt the federated token. Transmission between a transmitting authorized server 114 and a receiving authorized server 116 uses at least one set of keys in this example. However, a set of keys may exist for each authentication code 210. In addition, a set of keys may exist for each direction in which a challenge message is transmitted.

The types of keys depend on the nature of the encryption. Symmetric encryption requires two of the same keys to encrypt and decrypt while asymmetric encryption has a private key to encrypt and a partner key to decrypt. As used herein, the term "partner key" refers to a key known by one or more receiving authorized server 116 to decrypt information coming from a transmitting authorized server 114. In this sense, a "partner key" is similar to a public key and the fact that additional parties know the partner key is not of concern because as long as the private keys of the transmitting authorized servers 114 are kept confidential, an intercepting third party will be unable to use the partner key to forge a federated token.

In one embodiment, the authentication code 210 comprises a checksum. A checksum is an integer value computed using a series of arithmetic operations on a particular outgoing challenge message. The checksum is located in the federated token and sent along with the challenge message. At the receiving authorized server, the server recalculates the checksum for the received challenge message. If the recalculated checksum is different than the original checksum, then it is an indicator that the challenge message has been tampered with. In addition to verifying the integrity of the message, a checksum can be used to verify the origination of a message. This can be done by communicating appropriate session or partner keys in order to allow the receiving authorized server to recalculate the checksum. In addition, a checksum can be used in combination with other authentication methods. For example, a checksum can be made more secure by adding a private salt value to the plain text of the challenge message from which the checksum is generated. The private salt value is randomly generated text that is placed in the plaintext so that when the plaintext is encrypted, a different checksum is created each time, resulting in a checksum which is almost impossible to reproduce.

In another embodiment, the authentication code 210 may also comprise a hash value (also called a message digest). A hash value is a small amount of binary data that is generated from a text or other string of bytes. Hash values, like checksums, can be used to ensure the integrity of a federated token and are included in the federated token. In addition, hash values use asymmetric encryption methods to ensure the authenticity of the result, the sender using a private key to encrypt and a recipient using a partner key to decrypt. The receiving authorized server 116 recalculates the hash value to compare it with the original hash value that was sent with the message. If the recalculation results in a different hash value, then the receiving authorized server 116 can be almost certain that the challenge message has been tampered with.

In yet another embodiment, authentication code 210 can comprise a digital signature to verify that the federated token was generated by a transmitting authorized server. A digital signature consists of a small amount of binary data that is encrypted using the sender's private key. Successfully decrypting the digital signature using a partner key verifies that a message was sent from a particular user.

In one embodiment, a hash and a digital signature can be combined to verify the integrity and identity of the challenge message. The transmitting authorized server creates a hash value from the message and then signs the hash value using its private key. The receiving authorized server must have both the challenge message and the signature to successfully authenticate the origination of the message. First, a hash value must be created from the challenge message the same way the original hash value was created. The signature is also verified using the transmitting server's partner key. The recalculated hash value and verified digital signature are verified against the original hash value and digital signature to verify the integrity and origination of the challenge message.

Algorithms for performing the authentication features of the present invention thus can include, but are not limited to checksum algorithms such as, but not limited to, Cyclic Redundancy Check algorithms, CRC-8, CRC-16, and CRC-32; hashing algorithms such as, but not limited to, MD2, MD4, MD5, and Secure Hashing Algorithm (SHA); digital signature algorithms such as, but not limited to, digital signature algorithm (DSA) and digital signature standard (DSS); symmetrical encryption algorithms such as, but not limited to, Message Authentication Code (MAC) algorithms, RC2, RC4 and the Data Encryption Standard (DES); and combinations thereof. Where symmetric encryption algorithms are used, session keys should be changed often to prevent the possibility of third parties reducing the integrity of the secure communication.

As discussed above, more than one authentication code 210 may be provided to increase the difficulty of reproducing a federated token. For example, a checksum can be used with a salt value. A hash value can be used in combination with a digital signature. Asymmetric encryption can be used to encrypt session keys or digital signatures. It will be appreciated that the receiving authorized server 116 must have the partner key for each authentication code 210 used to create the federated tokens. For example, where both a hash value and a digital signature are implemented, the receiving authorized server 116 must have a first partner key for calculating the hash value and a second partner key for verifying the digital signature.

In asymmetric encryption, the same parties can use the same pair of keys to send authorized challenge messages to each other. For example, transmitting authorized server 114 can use a private key to encrypt a message and receiving authorized server 116 uses a partner key to decrypt. When sending a return message, server 116 could use the partner key to encrypt the message and server 114 could use the private key to decrypt the message. Thus, in some cases, only one set of keys need exist. However, to provide added levels of security, it may be preferable to provide only one-way encryption by requiring each transmitting authorized server 114 to only generate federated tokens using a private key and each receiving authorized server 116 to authorize the federated token using a partner key. That way, a third party cannot access a partner key and forge a federated token and send it to a transmitting authorized server 114 which could possibly authorize the federated token using the corresponding private key.

Figure 4A:
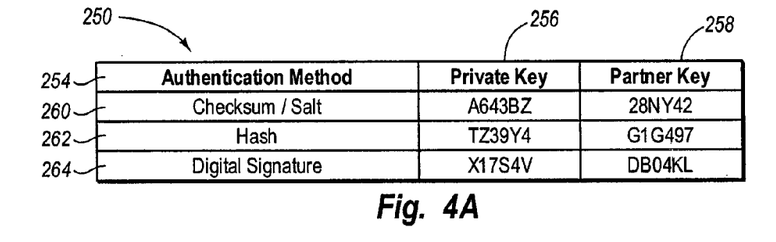
FIGS. 4A and 4B illustrate one embodiment of a data structure for maintaining partner key and private key information.
Figure 4B:
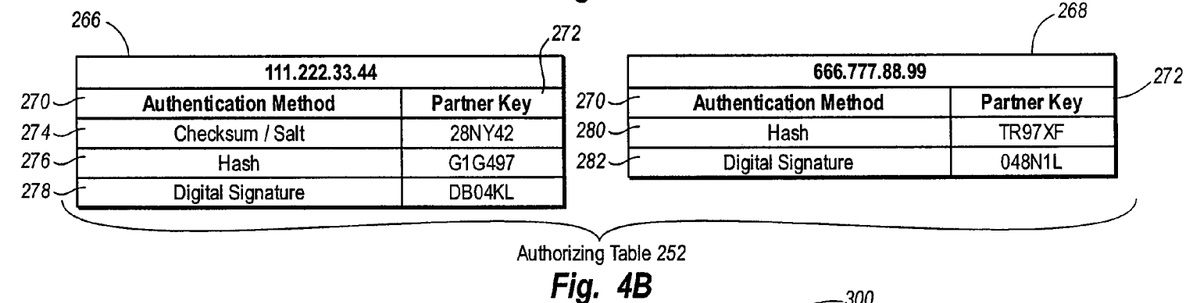

As shown in FIG. 2, each authorized server 114, 116 can reference a database 140, 142 to store and retrieve private and partner keys or any other information required to generate or authorize a federated token. With reference to FIGS. 4A and 4B, an exemplary data structure for a federated token generating table 250 and a federated token authorizing table 252 are shown, each of which can be stored in database 140 or 142. Databases 250 and 252 can be stored exemplarily in database 140 so that authorized server 114 is able to access the information. The information in generating table 250 is used to generate a federated token to be placed in an outgoing challenge message while the information in authorizing table 252 is used to authorize a federated token in a received challenge message. It will be appreciated that the number of databases and types of fields will depend on whether the server 114, 116 has both generation module 132 and authorization modules 128.

Generating table 250 includes exemplarily a field 254 to identify the particular authentication method used to generate the authentication code 210 of the federated token and a field 256 for the private key and field 258 for the partner key for each authentication method, assuming that the authentication method requires private and partner keys. For example, the authentication method 254 may include a checksum with a salt value 260, a hash 262 and a digital signature 264 for generating authentication code 210, each possibly requiring the use of a private key and partner key as reflected in fields 256, 258. In configurations where no private keys or partner keys are required it may not be necessary to have a generating table 250 at all. It will also be appreciated that where other portions of the federated token require the use of private/partner keys, e.g., the validation portion, the table 250 may incorporate additional fields to track the various keys or they may be stored in a separate table.

Authorizing table 252 includes exemplarily a table 266, 268 associated with two transmitting authorized servers that send a challenge message to a particular receiving authorized server. Each table 266, 268 includes a field 270 for authentication methods that each transmitting authorized server uses to generate security code 210 of the federated token and a field 272 to store the partner key to decrypt or recalculate the particular authentication method. For example, in table 266 could be stored the partner keys shown in generating table 250 for the same server. Field 270 identifies as authentication methods a checksum with a salt value 274, a hash 276, and a digital signature 278. Corresponding partner keys are maintained in field 272 and should correspond to the partner keys maintained by the transmitting authorized server.

In contrast, the table 268 for a second transmitting authorized server reflects in field 270 that the authentication methods are a hash 290 and a digital signature 282, with partner keys being stored in field 268. It will also be appreciated that where other portions of the federated token require the use of a private or partner key, e.g., the validation portion, the table 252 may incorporate additional fields to track the various keys or they may be stored in a separate table. Any of a variety of data structures containing the necessary information can be used, and any such data structure is referred to herein as tables 250 and 252.

Keys can be exchanged between authorized servers using a variety of methods. In one embodiment, private keys and/or partner keys can be conveyed to an authorized server when the authorized server first begins implementing the federated challenge message protocol. This can be done in person, over the phone, sending a confidential disc drive, and the like.

Alternatively, the partner keys can be sent over a network with the transmitted challenge message or in a subsequent secure message. In one embodiment, a certificate authorizing agency, illustrated in FIG. 2 as server 150, can serve as a certificate authorizing source for sharing partner keys. The certificate authorizing server 150 is shown independent of other messaging services 102, 104, 106, but can be part of a messaging service if desired. When an authorized server 114, 116 first implements the messaging protocol, they may create their own private and partner keys, but must be able to securely share the partner key with other messaging services. Thus, the certificate authorizing server 150 verifies to a recipient of a partner key that the partner key is valid. To ensure that the partner key information is coming from the certificate authorizing server 150, the certificate authorizing server uses cryptographic methods, such as a digital certificate.

In the embodiment where the certificate authorizing server 150 uses certification, the certificate authorizing server communicates with a database 152 to store information on each authorized server 114, 116 and the partner keys associated with each level of security for each server. Thus, the structure of database 152 can look much like tables 266, 268 of FIG. 4B. A transmitting authorized server 114 can generate a challenge message containing the server's partner key and send the challenge message to the certificate authorizing server 150 with a request to certify the challenge message. The request includes information such as the transmitting authorized server's IP address, the partner key(s), or other identifying information. The certificate authorizing server 150 verifies the identity of the transmitting authorized server (e.g., using partner key/private key encryption) and creates a signature portion to the challenge message, signed with the certificate authorizing server 150's private key, thus forming a certified challenge message. The certified challenge message is sent back to the transmitting authorized server. The transmitting authorized server can verify that the certified challenge message came from the certificate authorizing server 150 using the certificate authorizing server's partner key to verify the signature portion of the certified authorizing server 150.

The transmitting authorized server 114 can then forward the certified challenge message to a receiving authorized server 116. The receiving authorized server 116 (who also has access to the certificate authorizing server 150 partner key) can verify that the signature portion of the certified challenge message was signed by the certificate authorizing server 150. Thus, the receiving authorized server 116 can be sure that the partner key contained in the certified challenge message is the transmitting authorized server 114 partner key. Because the certificate authorizing server 150 only contains a store of partner keys, if a third party were to intercept a certified challenge message, it would not matter because, in most cases, both a private key and partner key would be need to complete any secure transaction.

It will be appreciated that the certification methods provided above are only one) way of exchanging keys. In one embodiment, the certificate authorizing server 150 can forward a certified challenge message directly to the receiving authorized server 116. In addition, the transmitting authorized server 114 and receiving authorized server 116 can use other means for exchanging keys. For example, keys can be exchanged directly between the servers 114, 116 without using a certificate authorizing server 150. Keys can be included in a challenge message or in a subsequent secure message. Additionally, authentication methods, such as those described above, may be used to ensure that keys are exchanged between servers 114, 116 safely and securely.

4. VALIDATION METHODS

As used herein, "validation" refers to any steps related to ensuring that the federated token is used appropriately. That is, even if the federated token is authentic, it may not necessarily be valid. Federated tokens are generally valid only for a specified period of time or for a single or limited number of uses. There may be unusual cases in which a person succeeds in accessing a federated token and attempts to misuse it. However, a federated token is limited in number of times or period of time in which it can be used. Moreover, someone who has access to a valid federated token and might misuse it would also generally have access to a valid "To:" and "From:" address pair that can be used to successfully send unwanted messages to the user (i.e., the party identified by the "From:" address) in an unlimited manner. In other words, the use of a federated token does not compromise message security and is useful in permitting certain desirable messages to be successfully delivered as described herein.

A particular federated token 138 can be configured to have a particular usage. For example, a specified federated token may be generated based on a single-use, multiple-use, or timed-use basis. Usage code 209 contains the information so that the receiving authorized server 116 can ascertain the defined usage for each federated token 138. A common coding can be used among servers 114, 116 so that authorized servers will consistently observe the same usage rules. As such, a small coding file may be placed on the generating table 250 and/or authorizing table 252 for each transmitting authorized server and/or receiving authorized server to reference. However, such a coding file has a minimal footprint and avoids the need for a larger table to be stored for each federated token. Further, the receiving authorized server 116 may store additional information to ascertain whether a federated token is valid need store a table of any extensive size since the federated token is being evaluated at the receiving end.

Figure 5:
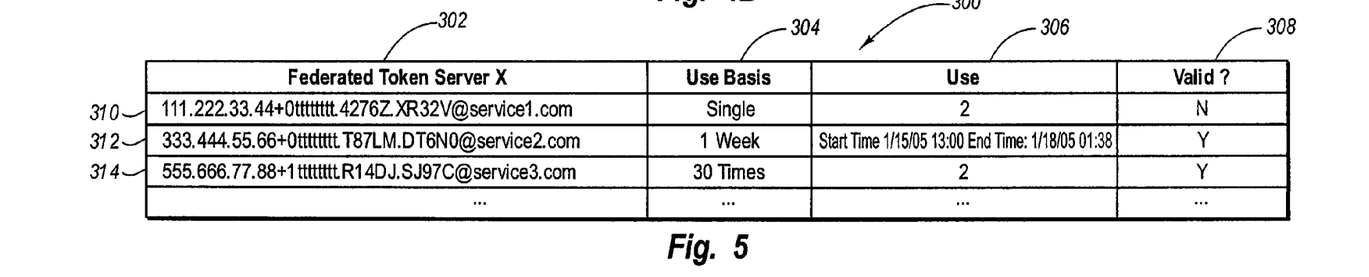
FIG. 5 illustrates one embodiment of a data structure for maintaining federated token usage.

Servers 114, 116 can access databases 140, 142, respectively, to maintain tables which monitor the use of federated tokens. As shown in FIG. 5, a table 300 tracks how a particular federated token can be and is being used. The table 300 has a field 302 that identifies the delivery ticket, a field 304 for identifying the defined use basis, field 306 for tracking instances of actual use, and a field 308 containing a validity flag. For example, as shown in FIG. 5, a first federated token may be valid for one use while a second federated token may be valid for 1 week. The use-basis of the federated token can be identified from the federated token itself using a uniform coding that is discernable only by federated messaging services. In addition, most uses will be extremely limited to a few uses or to a small amount of time so that any substantial use in the rare case of a third party who is able to access the information will alarm the authorized servers that the federated token is being abused.

It will be appreciated that table 300 can include more detailed information for federated tokens that have been received, as needed. Any of a variety of data structures containing the necessary information can be used, and any such data structure is referred to herein as a table 300.

In one embodiment, validation is based on the time stamp 206, uniquifier 208 and use code 209 features of the federated token 138 shown in FIG. 3. The time stamp 206 and uniquifier 208 can be generated using an 11 character base64 encoding of the time stamp and uniquifier. The use code 209 can be an encrypted alphanumeric code which symbolizes a particular use. The use code 209 can be encrypted using any of the methods described above for authentication codes 210 or any other encryption method.

The validity of federated tokens that are valid only for a specified period of time can be determined by directly examining the content of the federated tokens. The federated token table 300 is populated or updated each time a federated token is received. Once a federated token is successfully authenticated, as described above, the receipt of the federated token is recorded in field 302 of table 300 (assuming it is the first instance of receipt). The use-base is ascertained from the federated token and recorded in field 304. Based on the use-basis, use information is recorded in field 306. Field 306 has a counter tracking the number of times the particular federated token has been used. Alternatively, if desired, field 306 can include a counter identifying start times (e.g., using the time stamp 206 in the federated token) and times of actual receipt of a federated token. A comparison is then made between the defined use in field 304 and the actual use in field 306. A validity flag in field 308 then indicates whether the usage is valid or not. For example, as shown in FIG. 5, the use of the first federated token 310 is invalid because it has been used more than the specified number of times. However, the use of the other two federated tokens 312, 314 is valid because they fall within the specific usage. Subsequent receipt of federated tokens already listed in table 300 can either first reference the validity field 308 or can perform the validity steps outlined above.

The table 300 can also be updated when a user or administrator determines that a particular federated token has been misused or compromised. For example, an administrator could also set the validity flag to "invalid" if the server detects abuse of a particular federated token. This disabling of a federated token can be valuable in certain situations that might produce a security breach. For example, if a federated token having a use-base of one week is compromised, a user or an administrator can specifically disable the federated token to avoid a week-long security hole.

In another embodiment, a table 300 does not need to be maintained if all federated token usage is time-based. That is, the authorized time period can be ascertained from the federated token itself as well as the length of time between transmission and receipt (e.g., using the time stamp).

Another option is for certain federated tokens to be valid under conditions that combine use-based rules and time-based rules. For example, a federated token can be valid for a single use and for a certain amount of time, meaning that if either condition fails, the federated token is invalid. In this case, the federated token table 300 does not need to store the federated token information for an extended period of time.

5. OTHER MARKERS

The challenge message 136 may contain other markers which perform other functions as described in more detail in co-pending U.S. patent application Ser. No. 10/747,557, filed Dec. 29, 2003, which application is herein incorporated by reference in its entirety.

6. EXEMPLARY METHODS

The process of authorizing a challenge message will now be discussed in further detail. When a transmitting authorized server 114 sends a challenge message 136, server 114 uses tokenization module 132 to generate the federated token 138 embedded in the challenge message 136. As discussed above, the federated token 138 can be placed in any part of the challenge message 136, but is preferably placed in a location identifying the transmitting server.

The authorization module 130 at the receiving authorized server 116 analyzes the challenge message 136 to determine whether or not it is an authorized message. First, the authorization module 130 determines if challenge message 136 contains a federated token 138 somewhere embedded therein. Second, the authorization module 128 authenticates the federated token using any of the various methods described above for constructing authentication codes 210. For example, using a private key, the authorization module 130 could regenerate a checksum and verify that the regenerated checksum is the same as the checksum in the federated token 138. If the checksum in the federated token 138 is the same as the regenerated checksum, this indicates that the federated token is authentic, i.e., was generated by the server 114.

Finally, if the federated token is authentic, the authorization module 130 determines whether that particular use of the federated token is valid. The authorization module 130 may access database 142 to determine if there have been any prior uses of the particular federated token. Validation steps may occur as described above. Exemplarily situations in which a federated token is advantageous are described as follows:

Example 1

Identifying Challenge Message

Generally, the federated token concept can be applied to messaging systems in which the recipient of a challenge message has a filter mechanism which prevents messages from unknown senders to go to the recipient's inbox. With reference to the scenario of FIG. 1, the server at service B sends a challenge message containing an unknown sender address (e.g., postmaster@serviceB.com). This may be represented in FIG. 2 as the transmitting authorized server 114 generating a challenge message 136. In conventional challenge/response system of FIG. 1, the challenge message issued by server 114 may never be delivered to inbox 122 of user computer 110, preventing the user from responding because server 116 or computer 110 does not recognize the sender. Further, server 116 may also issue a challenge message, resulting in a "challenge war." However, the present invention resolves this dilemma by implanting federated tokens 138 in challenge message 136 which can be detected and authorized by server 116 to allow the challenge message to be delivered directly to inbox 122.

Example 2

Challenge Message in Response to Unknown Address

Another way that an unknown address can be inserted into a challenge message, resulting in the challenge message being sent to a recipient's pending folder is illustrated in FIG. 1B. That is, a message to a known address is forwarded to a remote account, which issues a challenge message. This scenario can also result in a "challenge war" where in reality the parties would actually likely not consider the challenge message as spam. Thus, in order to recognize that the challenge message 136 is in response to an action by the original sender, (even though the FROM address in the challenge message may be unrecognized), a federated token 138 is used to allow the challenge message to be sent directly to the inbox 122 of user computer 110 after the federated token is authorized.

7. SUMMARY

The above examples show that the federated tokens can be used to identify the existence of a challenge message independent of the sender's identity. To avoid a third party from abusing the challenge message form, authentication and validation steps are taken to ensure that the challenge message is sent from a federated messaging service. Once a challenge message is duly authorized, it can be sent directly to a recipient's inbox, allowing the recipient the opportunity to respond to the challenge messages. In addition, once a federated token has been successfully authorized, the sender's address may be placed on the recipient's authorized address list.

Advantageously, the present invention allows challenge messages to be delivered successfully to intended recipients of the challenge messages, since the intended recipients would most likely want to receive a challenge message since challenge messages are generated from a message that the intended recipient originally sent. The present invention is also implemented without requiring complex parsing of a challenge message, which can be time consuming and require large amounts of processing power or memory. Furthermore, certain messaging services that choose to be federated may benefit by preventing their members from issuing spam because challenge messages that result from a spam message will be sent directly to a spammer's inbox. The spammer generally relies on pending folder similar to other users to hold spam material.

The present invention is possible between multiple messaging services that can be relatively large in size because features of the present invention can be implemented in a decentralized manner. That is, the software for generating and authorizing challenge messages can be readily implemented into an existing system. Further, any communication between federated messaging services can be done using existing messaging protocols. Finally, the present invention reduces the amount of data storage required because only a minimal amount of information need be stored to generate or authorize a federated token.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer-implemented method, the method comprising:
    a first authorized server, which includes one or more processors, generating an electronic challenge message, wherein the electronic challenge message:
        identifies a sender and a recipient and contains data to be delivered to the recipient; and
        includes a federated token identifying that the electronic challenge message was sent from a federated server, the federated token also being configured to be authenticated and validated by a second authorized server that has previously formed a federated relationship with the first authorized server, such that the second authorized server delivers the electronic challenge message to the recipient's inbox without the second authorized server generating a second electronic challenge message based at least in part on the electronic challenge message having been sent from a federated server.

2. The method as recited in claim 1, wherein the federated token comprises one or more of:
    a checksum;
    a hash value;
    a digital signature portion;
    a digital signature portion applied by an external certificate authorizing server;
    an authentication code; or a validation code.

3. The method as recited in claim 2, wherein the checksum is derived using a private salt.

4. The method as recited in claim 2, wherein the validation code defines a use basis for evaluating the federated token.

5. The method as recited in claim 1, wherein the first authorized server is associated with one or more partner keys that are configured to allow the second authorized server to decrypt the federated token.

6. One or more non-transitory computer storage media that store an authorization module and a tokenization module, wherein:
   the authorization module comprises computer-executable instructions that are executable by one or more processors to:
      receive a first challenge message from a second server, wherein the first challenge message:
         identifies a first user associated with a first server as a recipient of the first challenge message and a second user associated with the second server as a sender of the first challenge message and contains data to be delivered to the first user; and
         includes a first federated token identifying the second server; and
      determine at least one of whether the first federated token is authentic and whether the first federated token is valid; and
   the tokenization module comprises computer-executable instructions that are executable by the one or more processors to generate a second challenge message identifying a third user associated with the second server as a recipient of the second challenge message and a fourth user associated with the first server as a sender of the second challenge message, the second challenge message comprising:
      a second federated token that identifies the second challenge message as being sent by a server that previously formed a federated relationship with the second server and that is configured to be one or both of authenticated or validated by the second server and used to deliver the second challenge message to an inbox of the third user without the second server generating a third challenge message in response to receiving the second challenge message based at least in part on the second challenge message having been sent from a federated server.

7. The non-transitory computer storage media of claim 6, wherein the authorization module further comprises computer-executable instructions that are executable by the one or more processors to deliver the first challenge message to an inbox of the first user after determining that the first federated token is at least one of authentic and valid.

8. The non-transitory computer storage media of claim 6, wherein the authorization module further comprises computer-executable instructions that are executable by the one or more processors to deliver the first challenge message to a pending folder of the first user after determining that the first federated token is not authentic or valid.

9. The non-transitory computer storage media of claim 6, wherein the computer-executable instructions that are executable to determine whether the first federated token is authentic comprise computer-executable instructions that are executable to perform at least one of:
   decrypting the federated token using a partner key associated with a private key used by the second server to encrypt the federated token;
   regenerating a checksum in the federated token to determine whether the regenerated checksum is the same as an original checksum originally included in the federated token;
   regenerating a hash value in the federated token to determine whether the regenerated hash value is the same as an original hash value originally included in the federated token; or
   verifying a digital signature contained in the federated token.

10. The non-transitory computer storage media of claim 6, wherein the tokenization module further comprises computer-executable instructions that are executable by the one or more processors to exchange one or more partner keys with the second server, the one or more partner keys configured to permit the second server to authenticate the second challenge message.

11. The non-transitory computer storage media of claim 10, wherein the computer-executable instructions that are executable to exchange the one or more partner keys with the second server include computer-executable instructions that are executable to perform at least one of:
   passing the second challenge message through a certificate authorizing server;
   sending the one or more partner keys to the second server with the second challenge message; or
   sending a message subsequent to the second challenge message to the second server, the subsequent message containing the one or more partner keys.

12. The non-transitory computer storage media of claim 6, wherein the computer-executable instructions are executable to generate the second challenge message in response to receiving an original message generated by the third user associated with the second server, the original message indicating the fourth user associated with the first server to receive the original message.

13. The non-transitory computer storage media of claim 6, wherein the computer-executable instructions that are executable to determine whether the first federated token is valid comprise computer-executable instructions that are executable to analyze the first federated token to determine a defined use base and to determine whether the receipt of the first federated token satisfies the defined use base.

14. The non-transitory computer storage media of claim 13, wherein the defined use base of the first federated token is at least one of single-based, multiple-based, or time-based usage.

15. An authorized server computer system, the authorized server comprising:
   a processor that is configured to execute computer-executable instructions;
   computer-executable instructions that are executable by the authorized server to transmit an original message generated by a first user associated with the authorized server to a second server, the original message indicating a second user associated with the second server to receive the original message;
   an authorization module comprising computer-executable instructions that are executable by the authorized server to:
      receive a first challenge message from the second server, wherein the first challenge message was generated in response to the first user being unknown to the second user, wherein the first challenge message:
         identifies the first user as a recipient of the first challenge message and the second user as a sender of the first challenge message and contains data to be delivered to the first user; and includes a first federated token identifying the second server;

determine at least one of whether the first federated token is authentic and whether the first federated token is valid; and deliver the first challenge message to an inbox of the first sender when the first challenge message is at least one of authentic and valid; and a tokenization module comprising computer-executable instructions that are executable by the authorized server to generate a second challenge message identifying a third user associated with the second server as a recipient of the second challenge message and a fourth user associated with the first server as a sender of the second challenge message, the second challenge message comprising:

a second federated token that identifies the second challenge message as being sent by a server that previously formed a federated relationship with the second server and that is configured to be one or both of authenticated or validated by the second server and used to deliver the second challenge message to an inbox of the third user without the second server generating a third challenge message in response to receiving the second challenge message based at least in part on the second challenge message having been sent from a federated server.

16. The authorized server of claim 15, wherein the second federated token includes a checksum generated by the tokenization module.

17. The authorized server of claim 16, wherein the checksum is generated by the tokenization module using a private salt.

18. The authorized server of claim 15, wherein the second federated token includes a hash value generated by the tokenization module.

19. The authorized server of claim 18, wherein the hash value is encrypted by the tokenization module using a private encryption key associated with the authorized server.

20. The authorized server of claim 15, wherein the tokenization module further comprises computer-executable instructions that are executable by the authorized server to perform at least one of:

passing the second challenge message through a certificate authorizing server;

sending one or more partner keys associated with a private key of the authorized server to the second server with the second challenge message; or sending a message subsequent to the second challenge message to the second server, the subsequent message containing the one or more partner keys.

* * * * *